(12) United States Patent
Tullman et al.

(10) Patent No.: US 7,601,660 B2
(45) Date of Patent: Oct. 13, 2009

(54) CLEAR GLASS COMPOSITION

(75) Inventors: Don Tullman, Troy, MI (US); Scott V. Thomsen, Milford, MI (US); Richard Hulme, Rochester Hills, MI (US); Leonid Landa, Grosse Ile, MI (US); Ksenia A. Landa, Grosse Ile, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1084 days.

(21) Appl. No.: 10/800,015

(22) Filed: Mar. 15, 2004

(65) Prior Publication Data

US 2005/0188725 A1 Sep. 1, 2005

Related U.S. Application Data

(60) Provisional application No. 60/548,180, filed on Mar. 1, 2004.

(51) Int. Cl.
*C03C 3/087* (2006.01)
*C03B 13/00* (2006.01)

(52) U.S. Cl. ............................. 501/70; 65/99.2; 501/71
(58) Field of Classification Search .................. 501/70, 501/71; 65/99.2
See application file for complete search history.

(56) References Cited

U.S. PATENT DOCUMENTS

| | | | |
|---|---|---|---|
| 5,346,864 A * | 9/1994 | Maugendre et al. ............ 501/35 |
| 5,558,942 A | 9/1996 | Itoh et al. | |
| 5,569,630 A | 10/1996 | Landa et al. | |
| 5,932,502 A | 8/1999 | Longobardo et al. | |
| 6,235,666 B1 * | 5/2001 | Cochran et al. ............... 501/64 |
| 6,407,021 B1 | 6/2002 | Kitayama et al. | |
| 6,461,736 B1 | 10/2002 | Nagashima et al. | |
| 6,521,558 B2 * | 2/2003 | Landa et al. .................. 501/64 |
| 6,548,434 B2 | 4/2003 | Nagashima | |
| 6,610,622 B1 * | 8/2003 | Landa et al. .................. 501/64 |
| 6,844,280 B2 * | 1/2005 | Koyama et al. ............... 501/70 |
| 7,135,425 B2 * | 11/2006 | Thomsen et al. .............. 501/64 |
| 7,144,837 B2 * | 12/2006 | Landa et al. .................. 501/71 |
| 7,169,722 B2 * | 1/2007 | Landa et al. .................. 501/71 |
| 2001/0056030 A1 | 12/2001 | Seto et al. | |
| 2003/0114290 A1 | 6/2003 | Landa et al. | |
| 2003/0144126 A1 | 7/2003 | Kitayama et al. | |
| 2003/0199384 A1 | 10/2003 | Landa et al. | |
| 2003/0216241 A1 | 11/2003 | Landa et al. | |
| 2003/0216242 A1 | 11/2003 | Arbab et al. | |

FOREIGN PATENT DOCUMENTS

| | | | |
|---|---|---|---|
| JP | 07109147 A | * | 4/1995 |
| JP | 10226534 A | * | 8/1998 |
| JP | 11-60269 | | 3/1999 |

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

Glass is provided so as to have high visible transmission and/or fairly clear or neutral color. In certain example embodiments, the glass may include a base glass (e.g., soda lime silica base glass) and, in addition, by weight percentage, from 0.01 to 0.30% total iron (expressed as $Fe_2O_3$). The glass may be made using a batch redox of at least +7.5.

26 Claims, No Drawings

CLEAR GLASS COMPOSITION

This application claims priority on U.S. Provisional Patent Application Ser. No. 60/548,180, filed Mar. 1, 2004, the entire disclosure of which is hereby incorporated herein by reference.

This invention relates to methods of making glass compositions, and glasses resulting from the same. More particularly, this invention relates to a method of making a glass having high light transmittance in the visible range and/or fairly neutral color. Such glass compositions are useful, for example, in architectural windows, patterned glass applications, solar cells, and/or automotive windows.

BACKGROUND OF THE INVENTION

Glass that is fairly clear in color and highly transmissive to visible light (e.g., at least 75% transmissive, or even more preferably at least 80% transmissive) is sometimes desirable. One way of achieving such as glass is to use very pure base glass materials (e.g., substantially free of colorants such as iron). However, base materials with a high degree of purity are expensive and thus not always desirable and/or convenient. In other words, for example, the removal of iron from glass raw materials has certain practical and/or economical limits.

First and second standard high transmission glass compositions are as follows. These standard compositions, and the methods of making the same, will be referred to herein as Comparative Example (CE) 1 and Comparative Example (CE) 2. The amounts of the various materials below for CE 1 and CE 2 are listed in terms of weight percentage (%) in the glass, unless otherwise indicated, and the optical characteristics were measured at a reference thickness of about 6 mm. Visible transmission was measured in terms of Lta (Ill. C. 2 deg.), whereas the a* and b* transmissive color values were measured in accordance with Ill. D65, 10 deg.

COMPARATIVE EXAMPLES 1 AND 2

| Element/Characteristic | CE 1 | CE 2 |
| --- | --- | --- |
| $SiO_2$ | 72.89 | 71.9 |
| $Na_2O$ | 13.48 | 13.66 |
| CaO | 8.57 | 9.12 |
| MgO | 4.06 | 3.76 |
| $Al_2O_3$ | 0.16 | 1.02 |
| $K_2O$ | 0.08 | 0.24 |
| $SO_3$ | 0.223 | 0.186 |
| $TiO_2$ | 0.01 | 0.04 |
| $Cr_2O_3$ | 8 ppm | 5 ppm |
| $Fe_2O_3$ (total iron) | 0.112 | 0.099 |
| % FeO | 0.023 | 0.029 |
| Glass Redox | 0.21 | 0.26 |
| Batch Redox | 6.7 | 6.3 |
| Lta ($T_{vis}$)(%) | 89.1 | 89.06 |
| a* | −1.48 | −1.43 |
| b* | 0.38 | 0.12 |

As can be appreciated from the above, the aforesaid Comparative Example (CE) glasses include rather low amounts of total iron. The total amount of iron present is expressed herein in terms of $Fe_2O_3$ in accordance with standard practice. However, typically, not all iron is in the form of $Fe_2O_3$. Instead, iron is usually present in both the ferrous state ($Fe^{2+}$; expressed herein as FeO, even though all ferrous state iron in the glass may not be in the form of FeO) and the ferric state ($Fe^{3+}$). Iron in the ferrous state (Fe 2; FeO) is a blue-green colorant, while iron in the ferric state ($Fe^{3+}$) is a yellow-green colorant. The blue-green colorant of ferrous iron ($Fe^{2+}$; FeO) is of particular concern when seeking to achieve a fairly clear or neutral colored glass, since as a strong colorant it introduces significant color into the glass. While iron in the ferric state ($Fe^{3+}$) is also a colorant, it is of less concern when seeking to achieve a glass fairly clear in color since iron in the ferric state tends to be weaker as a colorant than its ferrous state counterpart.

It can be seen that the two Comparative Examples (CEs) above had visible transmissions of about 89.1% and 89.06%, and transmissive a* color values of −1.48 and −1.43, respectively. There is room for improvement in this regard. In particular, it would be desirable if higher visible transmission could be achieved. It would also be desirable if more neutral transmissive color (i.e., a* values closer to zero or positive) could be achieved in order to gain more neutral coloration.

In view of the above, it is apparent that there exists a need in the art for a new glass composition, and/or method for making the same, which allows a glass to have fairly clear color and/or high visible transmission.

SUMMARY OF EXAMPLE EMBODIMENTS OF INVENTION

An object of this invention is to provide a glass that has fairly clear color and/or high visible transmission.

In certain example embodiments of this invention, it has surprisingly been found that by increasing the batch redox to a particular range during the manufacturing process of a low iron soda-lime-silica based glass, a glass composition with more neutral color and/or higher transmission can be achieved compared to the Comparative Examples discussed above.

The high transmission glasses of the Comparative Examples mentioned above used a batch redox of slightly over 6 in the melt. In contrast, in certain example embodiments of this invention, the batch redox has been raised in value. It has surprisingly been found that higher batch redox values, when making glass of this low-iron type, have allowed resulting glasses to achieve higher visible transmission and/or more neutral color without resulting in significant glass defects. In certain example embodiments, the batch redox in the melt can be increased by altering the elements which are added to the batch in the glass making process.

In certain example embodiments of this invention, low-iron soda-lime-silica based glass is made using a batch redox of from +7.5 to +14, more preferably of from +8 to +12, even more preferably from +8.5 to +11, and sometimes from +9 to +11. As explained above, it has unexpectedly been found that such batch redox values during the glass manufacturing process have permitted glasses with higher transmittance and more neutral color to be achieved, without resulting in significant glass defects due to seediness or the like.

In certain example embodiments of this invention, there is provided a method of making a glass comprising:

| Ingredient | wt. % |
| --- | --- |
| $SiO_2$ | 67-75% |
| $Na_2O$ | 10-20% |
| CaO | 5-15% |
| total iron (expressed as $Fe_2O_3$) | 0.01 to 0.30% | wherein the glass has visible transmission of at least 90%, a transmissive a* color value of −1.5 to +1.0, and a transmissive b* color value of −1.0 to +1.5, wherein the method comprises using a batch redox of from +7.5 to +14 when making said glass.

In other example embodiments of this invention, there is provided a method of making soda-lime-silica based glass, the method comprising using a batch redox of at least +7.5 when making the glass, wherein the glass has a visible transmission of at least 75%.

DETAILED DESCRIPTION OF CERTAIN EMBODIMENTS OF THIS INVENTION

Glasses according to different embodiments of this invention may be used, for example, in the automotive industry (e.g., windshields, backlites, side windows, etc.), in architectural window applications, for patterned glass applications, solar cell applications, and/or in other suitable applications.

Certain glasses according to example embodiments of this invention utilize soda-lime-silica flat glass as their base composition/glass. In addition to base composition/glass, a unique colorant portion is provided in order to achieve a glass that is fairly clear in color and/or has a high visible transmission. An exemplary soda-lime-silica base glass according to certain embodiments of this invention, on a weight percentage basis, includes the following basic ingredients:

Example Base Glass

| Ingredient | Wt. % |
| --- | --- |
| $SiO_2$ | 67-75% |
| $Na_2O$ | 10-20% |
| CaO | 5-15% |
| MgO | 0-7% |
| $Al_2O_3$ | 0-5% |
| $K_2O$ | 0-5% |

Other minor ingredients, including various conventional refining aids, such as $SO_3$, carbon, and the like may also be included in the base glass. In certain embodiments, for example, glass herein may be made from batch raw materials silica sand, soda ash, dolomite, limestone, with the use of salt cake ($SO_3$) and/or Epsom salts (e.g., about a 1:1 combination of both) as refining agents. Preferably, soda-lime-silica based glasses herein include by weight from about 10-15% $Na_2O$ and from about 6-12% CaO.

In addition to the base glass (e.g., see table above), in making glass according to certain example embodiments of the instant invention the glass batch includes a colorant portion having materials (including colorants and/or oxidizers) which cause the resulting glass to be fairly neutral in color and/or have a high visible light transmission. These materials may either be present in the raw materials (e.g., small amounts of iron), or may be added to the base glass materials in the batch. In certain example embodiments of this invention, the resulting glass has visible transmission of at least 75%, more preferably at least 80%, even more preferably of at least 85%, and most preferably of at least about 90%. In certain example non-limiting instances, such high transmissions may be achieved at a non-limiting reference thickness of about 5.6 mm, or alternatively at a non-limiting reference thickness of about 6 mm. In certain example instances, the glass has a visible transmission of at least 90.5% at such reference thicknesses.

In certain embodiments of this invention, in addition to the base glass, the glass batch comprises or consists essentially of materials as set forth in the table below (in terms of weight percentage of the total glass composition):

Example Glass Batch (In Addition to Base)

| Ingredient | General (Wt. %) | More Preferred | Possible |
| --- | --- | --- | --- |
| total iron (expressed as $Fe_2O_3$): | 0.01-0.30% | 0.02-0.20% | 0.03-0.08 |
| % FeO: | 0.001-0.10% | 0.002-0.05% | 0.004-0.015% |
| erbium oxide (e.g., $Er_2O_3$): | 0-0.30% | 0.02-0.20% | 0.03-0.13% |
| cerium oxide (e.g., $CeO_2$): | 0-0.30% | 0-0.18% | 0.03-0.12% |
| cobalt oxide (e.g., $Co_3O_4$): | 0-0.05% | 0-0.001% | 0-0.0005% |

In certain example embodiments of this invention, the colorant portion is substantially free of other colorants (other than potentially trace amounts). However, it should be appreciated that amounts of other materials (e.g., refining aids, melting aids, colorants and/or impurities) may be present in the glass in certain other embodiments of this invention without taking away from the purpose(s) and/or goal(s) of the instant invention. It is noted that the glass may be free or substantially free of cerium oxide and/or cobalt oxide in certain example embodiments of this invention. It is also possible for the glass to be free or substantially free of erbium oxide. In certain example embodiments of this invention, the glass may include no more than 2 ppm Se, more preferably no more than about 1 ppm Se; and/or may include no more than 10 ppm chromium oxide, more preferably no more than 6 ppm chromium oxide; and/or may includes no more than about 2 ppm cobalt oxide, more preferably no more than about 1 ppm cobalt oxide.

The batch is melted and the float process used to form glass (e.g., soda lime silica glass) in a known manner. The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{+2}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color.

It has been found that by providing the glass with a lower glass redox value (i.e., less iron in the ferrous state FeO) may help improved transmission and coloration to be achieved. In this regard, the proportion of the total iron in the ferrous state (FeO) is used to determine the redox state of the glass, and glass redox is expressed as the ratio FeO/ $Fe_2O_3$, which is the weight percentage (%) of iron in the ferrous state (FeO) divided by the weight percentage (%) of total iron (expressed as $Fe_2O_3$) in the resulting glass. In certain example embodiments of this invention, glass may have a redox value (i.e., FeO/$Fe_2O_3$) of less than or equal to 0.25, more preferably less than or equal to 0.20; even more preferably less than or equal to 0.16, and sometimes less than or equal to 0.13.

Glass redox is defined above. However, batch redox is different from glass redox. Batch redox is known in the art as being generally based on the following. Each component of the batch is assigned a redox number, and the batch redox is calculated as the sum total of the same. The calculations are based on the amount of a component per 2,000 kg of sand. The batch redox number is calculated before the glass is made (i.e., from the batch). A detailed discussed of how "batch redox" is determined is provided in *The redox number concept and its use by the glass technologist*, W. Simpson and D. D. Myers (1977 or 1978), the entire disclosure of which is hereby incorporated herein by reference. In contrast, as explained above, the glass redox is calculated after the glass has been made from spectral data, and is a ratio of % FeO (e.g., from a spectrum) to total iron in the glass (e.g., from chemical analysis).

The high transmission glasses of the Comparative Examples (CEs) mentioned herein used a batch redox of slightly over 6 in the melt. In contrast, in certain example embodiments of this invention, the batch redox has been raised in value. It has surprisingly been found that higher batch redox values, when making glass of this low-iron type, have allowed resulting glasses to achieve higher visible transmission and/or more neutral color without resulting in significant glass defects. In certain example embodiments, the batch redox in the melt can be increased by altering the elements which are added to the batch in the glass making process.

In certain example embodiments of this invention, low-iron soda-lime-silica based glass is made using a batch redox of from 7.5 to 14, more preferably of from 8 to 12, even more preferably from 8.5 to 11, and sometimes from 9 to 11. As explained above, it has unexpectedly been found that such batch redox values during the glass manufacturing process have permitted glasses with higher transmittance and more neutral color to be achieved, without resulting in significant glass defects due to seediness or the like.

In certain example embodiments of this invention, the batch redox can be raised from about 6 to the aforesaid ranges by, for example and without limitation, eliminating or reducing iron sources such as rouge and/or calumite which have high ferrous content, lowering the amount of certain reducing agent(s) such as carbon, and/or increasing the amount of oxidizing and/or refining agents such as salt cake ($Na_2SO_4$) added to the batch. The amounts of such materials added to the batch can be adjusted until the desired batch redox is achieved.

Moreover, resulting glass according to certain example embodiments of this invention may include iron in the ferrous state (FeO) in an amount (wt. %) of from 0.001 to 0.10, more preferably from 0.002 to 0.05, and most preferably from 0.004 to 0.015%.

It is noted that glass according to certain example embodiments of this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

In view of the above, glasses according to certain example embodiments of this invention achieve a neutral or substantially clear color and/or high visible transmission. In certain embodiments, resulting glasses according to certain example embodiments of this invention may be characterized by one or more of the following transmissive optical or color characteristics when measured at a thickness of from about 1 mm-6 mm (most preferably a thickness of about 5.6 mm and/or 6 mm, which are non-limiting thicknesses used for purposes of reference only) (Lta is visible transmission %):

Characteristics of Certain Example Embodiments

| Characteristic | General | More Preferred | Most Preferred |
|---|---|---|---|
| Lta (Ill. C, 2 deg.): | >=80% | >=85% | >=90% |
| L* (Ill. D65, 10 deg.): | 90-100 | n/a | n/a |
| a* (Ill. D65, 10 deg.): | −1.5 to +1.0 | −1.0 to +1.0 | −0.8 to +0.50 |
| b* (Ill. D65, 10 deg.): | −1.0 to +1.5 | −0.7 to +1.0 | 0 to +0.5 |

As can be seen from Table 7 above, glasses of certain embodiments of this invention achieve desired features of fairly clear color and/or high visible transmission, while not requiring iron to be eliminated from the glass composition. This may be achieved through the provision of the unique glass redox values used in certain example embodiments of this invention and/or via the colorant portions described herein. The visible transmission of the glass may even be at least 90.5% in certain example instances.

EXAMPLES 1-5 AND COMPARATIVE EXAMPLES

Example glasses of this invention made using the known float process are compared below to Comparative Examples CE 1 and CE 2. It can be seen from comparing the glasses of Examples 1-5 to the CEs that much improved results (i.e., higher visible transmission and more neutral a* color) were achieved by using higher batch redoxes during the manufacturing process according to certain example embodiments of this invention. The amounts of the various materials set forth below are listed in terms of weight percentage (%) in the glass, unless otherwise indicated, and the optical characteristics were measured at a reference thickness of about 6 mm. Visible transmission was measured in terms of Lta (Ill. C. 2 deg.), whereas the a* and b* transmissive color values were measured in accordance with Ill. D65, 10 deg.

EXAMPLES

| Feature | CE 1 | CE 2 | Ex. 1 | Ex. 2 | Ex. 3 | Ex. 4 | Ex. 5 |
|---|---|---|---|---|---|---|---|
| $SiO_2$ | 72.89 | 71.9 | 73.24 | 73.21 | 73.21 | 73.27 | 71.83 |
| $Na_2O$ | 13.48 | 13.66 | 13.46 | 13.44 | 13.45 | 13.41 | 13.66 |

-continued

| Feature | CE 1 | CE 2 | Ex. 1 | Ex. 2 | Ex. 3 | Ex. 4 | Ex. 5 |
|---|---|---|---|---|---|---|---|
| CaO | 8.57 | 9.12 | 8.51 | 8.56 | 8.55 | 8.52 | 8.98 |
| MgO | 4.06 | 3.76 | 4.25 | 4.26 | 4.27 | 4.25 | 3.99 |
| $Al_2O_3$ | 0.16 | 1.02 | 0.18 | 0.15 | 0.16 | 0.17 | 0.93 |
| $K_2O$ | 0.08 | 0.24 | 0.06 | 0.07 | 0.08 | 0.09 | 0.31 |
| $SO_3$ | 0.223 | 0.186 | 0.23 | 0.22 | 0.22 | 0.23 | 0.22 |
| $TiO_2$ | 0.01 | 0.04 | 0.014 | 0.013 | 0.013 | 0.014 | 0.039 |
| $Cr_2O_3$ | 8 ppm | 5 ppm | 6 | 6 | 4 | 1 | 5 |
| $Fe_2O_3$ (total iron) | 0.112 | 0.099 | 0.054 | 0.062 | 0.052 | 0.056 | 0.045 |
| % FeO | 0.023 | 0.029 | 0.009 | 0.011 | 0.008 | 0.006 | 0.0055 |
| Glass Redox | 0.21 | 0.26 | 0.16 | 0.17 | 0.15 | 0.11 | 0.12 |
| Batch Redox | 6.7 | 6.3 | 8.6 | 8.5 | 8.8 | 9.1 | 9.3 |
| Lta ($T_{vis}$)(%) | 89.1 | 89.06 | 90.74 | 90.37 | 90.91 | 90.66 | 90.63 |
| a* | −1.48 | −1.43 | −0.66 | −0.75 | −0.65 | −0.53 | −0.49 |
| b* | 0.38 | 0.12 | 0.25 | 0.43 | 0.26 | 0.41 | 0.26 |

It can be seen from the above that when a higher batch redox was used in the manufacturing process (as in Examples 1-5, compared to the Comparative Examples CE1 and CE2) surprisingly higher visible transmission and more neutral a* coloration were achieved in the resulting glasses. Thus, the higher batch redox values according to certain example embodiments of this invention provide for unexpected results not heretofore realized. In particular, note the higher visible transmission (Lta) realized in Examples 1-5 compared to CE1 and CE2. Also note that more neutral transmissive a* color achieved in Examples 1-5 compared to CE1 and CE2. It is believed that the higher batch redox values used in Examples 1-5 was a significant factor in permitting these improved results to be realized. It is believed that low glass redox may have also contributed in this regard.

Once given the above disclosure many other features, modifications and improvements will become apparent to the skilled artisan. Such features, modifications and improvements are therefore considered to be a part of this invention, the scope of which is to be determined by the following claims:

The invention claimed is:

1. A method of making a glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.01 to 0.30% | wherein the glass has visible transmission of at least 90%, a transmissive a* color value of −1.5 to +1.0, and a transmissive b* color value of −1.0 to +1.5, wherein the method comprises:
utilizing a batch redox of from +7.5 to +14 when making said glass.

2. The method of claim 1, wherein the glass comprises:

| total iron (expressed as $Fe_2O_3$) | 0.02 to 0.20% |
|---|---|
| erbium oxide | 0.02 to 0.20%. |

3. The method of claim 1, wherein the batch redox utilized in making the glass is from +8 to +12.

4. The method of claim 1, wherein the batch redox utilized in making the glass is from +8.5 to +11.

5. The method of claim 1, wherein the batch redox utilized in making the glass is from +9 to +11.

6. The method of claim 1, wherein the glass comprises:

| total iron (expressed as $Fe_2O_3$): | 0.01-0.30% |
|---|---|
| % FeO: | 0.001-0.10% |
| glass redox: | <=0.25 |
| erbium oxide: | 0-0.30% |
| cerium oxide: | 0-0.30% |
| cobalt oxide: | 0-0.001%. |

7. The method of claim 1, wherein the glass comprises:

| total iron (expressed as $Fe_2O_3$): | 0.02-0.20% |
|---|---|
| % FeO: | 0.002-0.05% |
| glass redox: | <=0.20 |
| erbium oxide: | 0.02-0.20% |
| cerium oxide: | 0-0.18% |
| cobalt oxide: | 0-0.0005%. |

8. The method of claim 1, wherein the glass comprises:

| total iron (expressed as $Fe_2O_3$): | 0.03-0.08% |
|---|---|
| % FeO: | 0.004-0.015% |
| glass redox: | <=0.20 |
| erbium oxide: | 0.03-0.13%. |

9. The method of claim 1, wherein the glass has a redox value ($FeO/Fe_2O_3$) no greater than 0.16.

10. The method of claim 1, wherein the glass further comprises from 0.001 to 0.10% FeO.

11. The method of claim 1, wherein the glass comprises from 0.002 to 0.05% FeO.

12. The method of claim 1, wherein the glass comprises from 0.004 to 0.015% FeO.

13. The method of claim 1, wherein the glass comprises less than or equal to 0.0002% cobalt oxide.

14. The method of claim 1, wherein the glass comprises less than or equal to 0.0001% cobalt oxide.

15. The method of claim 1, wherein the glass comprises less than or equal to 0.0002% cerium oxide.

16. The method of claim 1, wherein the glass comprises less than or equal to 0.0001% cerium oxide.

17. The method of claim 1, wherein the glass has a transmissive a* color value of −1.0 to +1.0.

18. The method of claim 1, wherein the glass has a transmissive a* color value of −0.8 to +0.5 and a transmissive b* color value of −0.7 to +1.0.

19. The method of claim 1, wherein the glass comprises from 0-5% MgO, from 0-5% $K_2O$ and from 0-5% $Al_2O_3$.

20. The method of claim 1, wherein the glass includes a colorant portion which consists essentially of:

| | |
|---|---|
| total iron (expressed as $Fe_2O_3$): | 0.01-0.30% |
| erbium oxide: | 0-0.30% |
| cerium oxide: | 0-0.30% |
| cobalt oxide: | 0-0.0005%. |

21. The method of claim 1, wherein the glass includes a colorant portion which consists essentially of total iron (expressed as $Fe_2O_3$) in an amount of from 0.01 to 0.30%.

22. A method of making soda-lime-silica based glass, the method comprising utilizing a batch redox of at least +7.5 when making the glass, wherein the glass has a visible transmission of at least 75%.

23. The method of claim 22, wherein the glass comprises:

| | |
|---|---|
| $SiO_2$ | 67-75% |
| $Na_2O$ | 10-20% |
| CaO | 5-15% |
| total iron (expressed as $Fe_2O_3$) | 0.01 to 0.30% | and wherein the glass has visible transmission of at least 80%, and a transmissive a* color value of −1.5 to +1.0.

24. The method of claim 23, wherein the glass has a visible transmission of at least 85%, and a transmissive a* value of −1.0 to +1.0.

25. The method of claim 22, wherein the glass has a glass redox value of no greater than 0.20.

26. The method of claim 22, wherein the batch redox utilized in making the glass is from +8 to +12.

* * * * *